United States Patent [19]

Burns

[11] Patent Number: 4,685,130
[45] Date of Patent: Aug. 4, 1987

[54] SUBSCRIBER LINE CIRCUIT HAVING AN IMPROVED LOOP CURRENT SUPPLY CIRCUIT

[75] Inventor: Robert V. Burns, Phoenix, Ariz.

[73] Assignee: GTE Communication Systems Corporation, Phoenix, Ariz.

[21] Appl. No.: 770,466

[22] Filed: Aug. 29, 1985

[51] Int. Cl.$^4$ ............................................. H04M 19/00
[52] U.S. Cl. ..................................... 379/413; 379/399
[58] Field of Search ............ 179/16 AA, 16 F, 18 FA, 179/70, 77, 81 R, 170 NC; 379/322, 324, 348, 399, 413, 382, 405, 347

[56] References Cited

U.S. PATENT DOCUMENTS

| | | | |
|---|---|---|---|
| 4,203,009 | 5/1980 | Tattersall | 379/399 |
| 4,476,350 | 10/1984 | Aull et al. | 379/382 |
| 4,532,381 | 7/1985 | Rosenbaum et al. | 379/405 |
| 4,571,460 | 2/1986 | Rosenbaum et al. | 379/347 |
| 4,581,487 | 4/1986 | Cochran | 379/400 |

Primary Examiner—Gene Z. Rubinson
Assistant Examiner—R. Vaas
Attorney, Agent, or Firm—Anthony Miologos; Peter Xiarhos

[57] ABSTRACT

An improved loop current supply circuit including a first amplifier connected to a source of bias voltage. The first amplifier is further connected to a subscriber loop circuit through the tip and ring conductors. The first amplifier receives the bias voltage and supplies loop current to the loop circuit. A second amplifier connected to the tip and ring conductors outputs a voltage representative of the amount of current in the subscriber loop. When the output voltage of the second amplifier becomes greater than the bias voltage, a loop voltage network connected to the second amplifier and to the bias voltage source shunts the bias voltage from the first amplifier, decreasing the current in the loop circuit.

7 Claims, 1 Drawing Figure

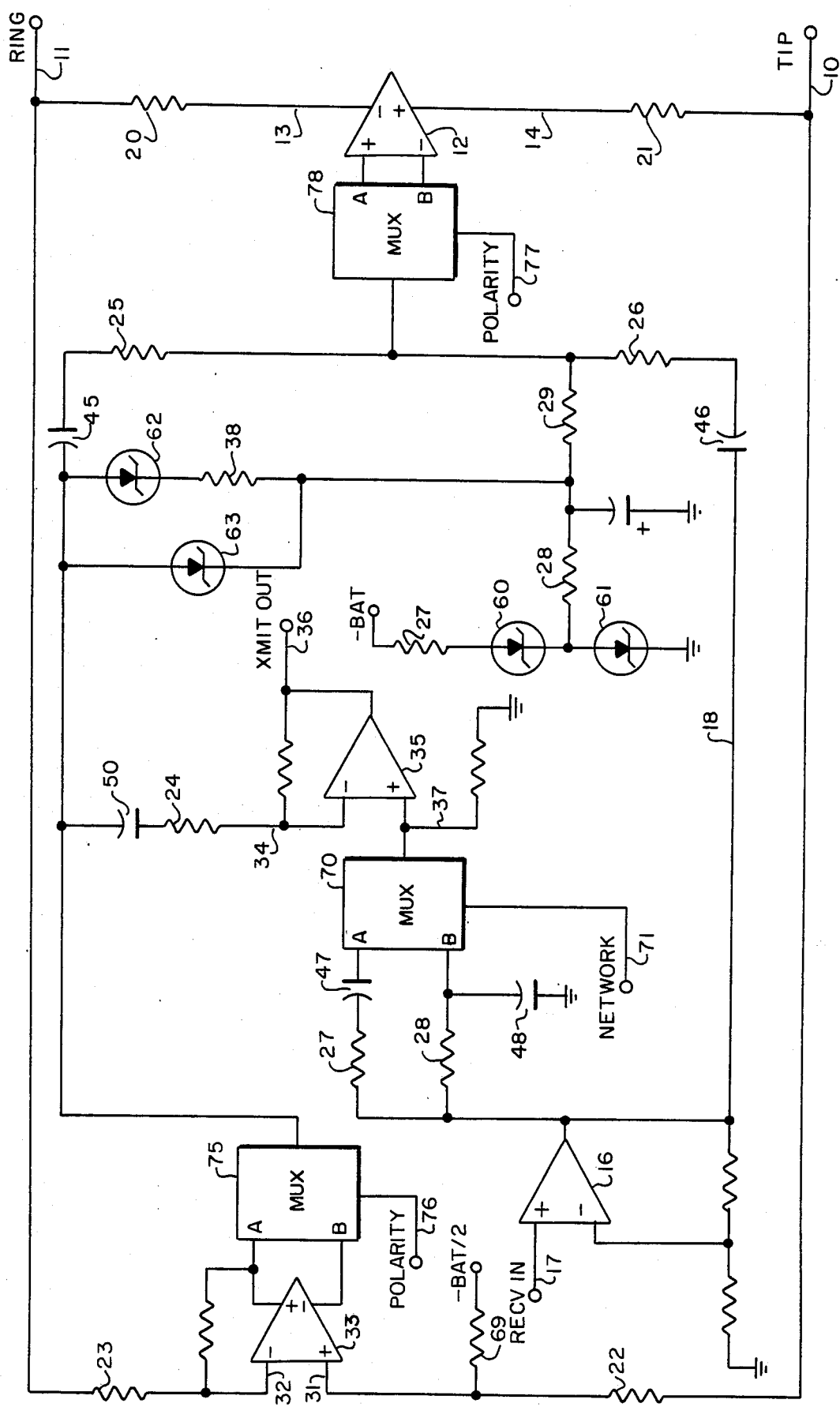

– 1 –

SUBSCRIBER LINE CIRCUIT HAVING AN IMPROVED LOOP CURRENT SUPPLY CIRCUIT

CROSS-REFERENCE TO RELATED APPLICATIONS

The present application related to co-pending U.S. patent application Ser. No. 770,467, titled "A Subscriber Line Circuit Having Improved AC Impedance Matching", and U.S. patent application Ser. No. 770,465, titled "A Subscriber Line Circuit Having An Improved Offhook Supervision Circuit", each having the same inventive entity and each being assigned to the same assignee.

BACKGROUND OF THE INVENTION

This invention relates in general to solid state analog subscriber line circuits used in telecommunication systems and more particularly to a solid state analog subscriber line circuit having an improved AC impedance matching capability and an improved loop current supply circuit.

Traditionally subscriber line circuits have used inductive type battery feed circuits. These circuits provide excellent performance and low cost but their characteristic components require large amounts of space and have great weight.

Analog line circuits which use lighter and smaller solid state components are finding increased usage in the telecommunications industry today. However, these circuits do not provide performance equal to the inductive line circuits of the past. One of the great disadvantages to the presently known solid state analog line circuits is their inability to function in the presence of high longitudinal voltages and currents on the tip and ring leads of the line circuit.

One technique presently known for overcoming the above mentioned shortcomings is the use of a small transformer and associated circuitry which cancels any magnetic flux in the transformer produced by the loop current. This technique finds disadvantage in that it provides inferior performance relative to a larger transformer and it consumes additional power in the flux cancellation winding of the transformer.

Subscriber line circuits must operate in long loop conditions as efficiently as they do in short loops. In order to supply sufficient loop current to a subscriber instrument on long loops it becomes advantages to use the lowest practical value of battery feed resistance. However, it is also desirable to keep short loop current within some reasonable value to allow the line circuit to operate at a reasonable power level.

It therefor becomes an object of the present invention to provide a solid state analog line circuit which exhibits performance superior to an inductive line circuit in the area of AC impedance matching and loop performance.

SUMMARY OF THE INVENTION

In accomplishing the object of the present invention there is provided a subscriber line circuit having a tip conductor and a ring conductor connected to a subscriber loop circuit.

The improved loop current supply circuit of the present invention includes a bias voltage generating means for providing the supply circuit with a source of bias voltage. A first amplifier means is connected to the bias voltage generating means and includes a first output connected to the tip conductor through first resistance means and a second output connected to the ring conductor through second resistance means. The first amplifier receives the bias voltage from the bias voltage generating means and supplies loop current to the subscriber loop circuit.

A second amplifier means having a first input connected to the tip conductor and a second input connected to the ring conductor is arranged to receive the loop voltage from the first amplifier and output a voltage representative of the level of loop current in the subscriber line.

A voltage sensing means is connected to the second amplifier means where it receives the second amplifier means voltage output and is further connected to the bias voltage generating means. As the current in the subscriber loop increases the voltage output from the second amplifier means decreases. When the second amplifier means output voltage drops below the bias voltage the voltage sensing means shunts the bias voltage from the first amplifier means thereby, limiting the current in the loop circuit.

A BRIEF DESCRIPTION OF THE DRAWINGS

The single sheet of drawings included herewith comprise a schematic diagram of a subscriber line circuit having an improved loop current supply circuit embodying the principles of operation of the present invention.

DESCRIPTION OF THE PREFERRED EMBODIMENT

Turning now to the single sheet of the included drawings, the present invention is shown connected to a subscriber loop circuit via a pair of loop conductors. A tip conductor labeled 10 and the ring conductor labeled 11. Loop conductors 10, 11 are driven by buffer amplifier 12 which is comprised of a unity gain differential output amplifier. The inverting output 13 of buffer amplifier 12 drives the ring conductor 11 thru resistor 20. The non-inverting output 14 of buffer amplifier 12 drives the tip conductor 10 thru resistor 21. Buffer amplifier 12 serves to supply DC loop current as well as AC RECV signals to the loop.

Signals to be output to the subscriber loop circuit are applied first to the RECV IN lead 17 and the non-inverting input of buffer amplifier 16 and then via lead 18 to buffer amplifier 12 and the tip and ring conductors 10, 11 respectively. These signals are transported across the subscriber loop to a subscriber instrument and applied to the receiver.

XMIT signals from a subscriber instrument transmitter are sent over the subscriber loop and appear at the tip and ring conductors 10 and 11 respectively. The XMIT signals appearing at the tip conductor 10 are applied to the non-inverting input 31 of differential amplifier 33 via resistor 22. Likewise, the XMIT signal appearing on the ring conductor 11 is applied to the inverting input 32 of amplifier 33 via resistor 23. The output of amplifier 33 is sent to the inverting input of amplifier 35 via capacitor 50 and resistor 24. The received XMIT signal is output via the XMIT OUT lead 36.

RECV signals applied to the tip and ring conductors 10, 11 by amplifier 16 and buffer amplifier 12 also appear at the input of amplifier 35. In order to prevent these signals from reaching the XMIT OUT lead 36 RECV signals from the output of amplifier 16 are also applied to the non-inverting input 37 of amplifier 35. The RECV signals than cancel at the output of amplifier 35.

For applications requiring two or more balancing networks multiplexer 70 selects the desired network from a first resistor capacitor combination comprising of resistor 27 and capacitor 47, and a second resistor capacitor combination comprising resistor 28 and capacitor 48. A network enable lead 71 toggles multiplexer 70 and switches in the selected network.

DC loop current is supplied to the ring and tip conductors 10, 11 by applying a DC bias voltage to the input of buffer amplifier 12. The bias voltage is applied to the input of buffer amplifier 12 from the negative battery terminal though a network consisting of resistor 27, zener diodes 60, 61 and resistors 28, 29. The voltage drop across zener diode 61 insures that the bias voltage will be a fixed voltage below the supply voltage. The bias voltage is required to be sufficiently below the supply voltages powering buffer amplifier 12 in order to allow adequate AC signal swing at the output of buffer amplifier 12.

Normally, the DC battery feed resistance of the line circuit is lower than the AC impedance of the loop circuit. In order to provide proper impedance matching with the loop circuit, the present invention uses internal feedback to achieve any desired AC impedance of tip and ring.

AC signals appearing at the tip and ring conductors 10 and 11 are transported and applied to amplifier 33. The output of amplifier 33 is passed to amplifier 12 via a divider network consisting of resistor 25, capacitor 45 and resistor 26, capacitor 46. The feedback signal applied to buffer amplifier 12 from amplifier 33 is in phase with the signal appearing at the tip and ring conductors 10, 11. The input signal applied is thus reinforced and raises the impedance seen by the tip and ring conductors above the DC value of resistors 20 and 21.

Longitudinal signals induced by power lines into the subscriber loop and appearing at the tip and ring conductors 10, 11 are cancelled out by the common mode rejection of buffer amplifier 33 and therefore do not appear at the XMIT OUT lead 36 of amplifier 35. In order to insure that the all longitudinal signals are cancelled by amplifier 33 the tip and ring impedances must be equal and therefore the gains of the two inputs 31, 32 of amplifier 33 must be equal. The level of longitudinal signals which can be cancelled by the invention is determined by the ability of buffer amplifier 12 to sink equal amounts of current without becoming non-linear, and the ability of amplifier 33 to maintain equal gains at its inputs as the longitudinal voltage increases.

It therefor becomes necessary that the resistors 20 and 21 be matched as close as possible. Slight mismatches can be compensated for in the invention by adjusting the gain balance of amplifier 33. In order to provide for extremely high rejection of longitudinal signals, resistor 69 may be adjusted to compensate for other circuit components which may effect longitudinal balance and rejection.

In order to supply sufficient loop current for long loop conditions resistors 20 and 21 normally have a value which will apply the lowest practical battery feed resistance to the circuit. However, in order to keep the short loop current within a reasonable value the present invention uses internal feedback to sense when excessive loop current is present.

As described earlier, DC loop current is supplied to the ring and tip conductors 10, 11 by applying a DC bias voltage to the input of buffer amplifier 12. The bias voltage is applied to the input of buffer amplifier 12 from the negative battery terminal though a network consisting of resistor 27, zener diodes 60, 61 and resistors 28 and 29. This DC bias also appears at the inputs of amplifier 33 and is coupled to buffer amplifier 12 via a loop voltage sensor network comprised of zener diode 62 and resistors 38 and 28. As the loop current increases the voltage at the output of amplifier 33 decreases. When loop current becomes high enough to cause the output of amplifier 33 to drop below the bias voltage at the junction of resistors 28 and 29, zener diode 62 begins to conduct, shunting the bias voltage and limiting the loop current. The ratio, (resistor 38/resistor 28), controls the slope of the loop current vs. loop resistance.

Zener diode 63 provides constant current loop current independent of loop resistance below a specified value. This is used to limit power dissipation in the line circuit as a precaution against a shorted loop.

Polarity reversal of the tip and ring conductors is accomplished by multiplexers 75 and 78 which select the inverting output of amplifier 33 and the non-inverting input of buffer amplifier 12 when enabled via enabling signals applied to the network leads 76 and 77 respectively from common control equipment (not shown).

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a subscriber line circuit having a tip conductor and a ring conductor connected to a subscriber loop circuit, an improved loop current supply circuit comprising:

bias voltage generating means for providing a source of bias voltage;

first amplifier means connected to said bias voltage generating means and including a first output connected to said tip conductor through first resistance means and a second output connected to said ring conductor through second resistance means, said first amplifier further including a first input and a second input each arranged to receive said bias voltage and supply loop current to said subscriber loop circuit;

first selection means including an input connected to said bias voltage generating means and first and second outputs connected to said first amplifier first and second inputs respectively, said first selection means further including an enabling lead connected to common control equipment and a source of enabling signals, said first selection means arranged to connect said first amplifier first input or alternatively said second input to said bias voltage generating means responsive to said enabling signals;

second amplifier means including a first input connected to said tip conductor, and a second input connected to said ring conductor, said second amplifier arranged to receive said loop current from said first amplifier and output a voltage representative of the level of loop current in said subscriber line; and voltage sensing means connected to said second amplifier means arranged to receive said second amplifier means voltage output, and said voltage sensing means further connected to said bias voltage generating means whereby, responsive to an increase in loop current said voltage output from said second amplifier means decreases, and said voltage sensing means shunts said bias voltage from said first amplifier means when said second amplifier output voltage drops below said bias voltage.

2. The subscriber line circuit as claimed in claim 1, wherein: said first amplifier means comprises a unity gain differential output amplifier having a non-inverting output connected to said first resistance means and comprising said first output, and an inverting output connected to said second resistance means and comprising said second output, said unity gain differential output amplifier further including a non-inverting and an inverting input, said non-inverting and said inverting inputs each connected to said first and said second outputs respectively of said first selection means.

3. The subscriber line circuit as claimed in claim 1, wherein: said first resistance means comprises a resistor connected in series between said first amplifier means first output and said tip conductor and said second resistance means comprises a resistor connected in series between said first amplifier means second output and said ring conductor.

4. The subscriber line circuit as claimed in claim 1, wherein: said second amplifier means comprises a unity gain differential output amplifier having a non-inverting input connected to said tip conductor and an inverting input connected to said ring conductor, said unity gain differential output amplifier including a non-inverting and an inverting output and each of said non-inverting and inverting outputs connected to a second selection means, said second selection means further including an output connected to said voltage sensing means, and an enabling means connected to common control equipment and a source of enabling signals, and responsive to said enabling signals said second selection means connects said unity gain differential output amplifier non-inverting input or alternatively said inverting input to said second selection means output.

5. The subscriber line circuit as claimed in claim 2, wherein: said bias voltage means comprises a bias network having at least one zener diode and first and second resistors, said bias network including a first end connected to a negative battery source and a second opposite end connected to said first selection means input.

6. The subscriber line circuit as claimed in claim 5, wherein: said voltage sensing means comprises a voltage sensor network having a first zener diode and a first resistor, said zener diode having its anode connected to said second amplifier means voltage output and its cathode connected to said voltage sensor network first resistor, said voltage sensor network first resistor connected to said bias voltage network first and second resistors whereby, said zener diode turns on shunting said bias voltage away from said first amplifier means responsive to said second amplifier means voltage output becoming smaller than the bias voltage sensed at the junction of said voltage sensor network first resistor and said bias voltage network first and second resistors.

7. In a subscriber line circuit having a tip conductor and a ring conductor connected to a subscriber loop circuit, an improved loop current supply circuit comprising:

bias voltage means for providing a source of bias voltage;

line circuit means having a first and a second input, and said line circuit means connected to said subscriber loop circuit through said tip and ring conductors, said line circuit means arranged to supply loop current to said subscriber loop;

first selection means including an input connected to said bias voltage generating means and first and second outputs connected to said line circuit means first and second inputs respectively, said first selection means further including an enabling lead connected to common control equipment and a source of enabling signals, said first selection means arranged to connect said line circuit means first input or alternatively said second input to said bias voltage generating means responsive to said enabling signals;

line sensing means connected to said tip and ring conductors arranged to output a voltage representative of the level of loop current in said subscriber line; and voltage sensing means connected to said line sensing means and to said line circuit means whereby, said voltage sensing means shunts said bias voltage thereby decreasing said loop current in response to an increase in loop current.

* * * * *